A. SHEDLOCK.

Presses.

No. 6,075. Reissued Oct. 6, 1874.

Witnesses.

Richard Edmonds

William J. Shedlock

Alfred Shedlock

Inventor.

THE GRAPHIC CO. PHOTO-LITH. 39 & 41 PARK PLACE, N.Y.

UNITED STATES PATENT OFFICE.

ALFRED SHEDLOCK, OF NEW YORK, N. Y., ASSIGNOR TO RICHARD ESMOND.

IMPROVEMENT IN PRESSES.

Specification forming part of Letters Patent No. 149,347, dated April 7, 1874; reissue No. 6,075, dated October 6, 1874; application filed August 3, 1874.

*To all whom it may concern:*

Be it known that I, ALFRED SHEDLOCK, of the city of New York, in the county and State of New York, have invented certain Improvements in Presses, of which the following is a specification:

This invention relates to certain improvements in presses in which the follower is operated by the straightening of two toggle-joints drawn together by a right-and-left-hand screw.

This invention consists of a screw working through nuts, and of arms operating and acting directly as pawls within notches of the follower, as will be hereinafter described; and it further consists of a peculiar combination of parts, which are hereinafter described, and pointed out in the claims.

I will refer to the accompanying drawings, forming part of this specification, in which—

Figure 1:
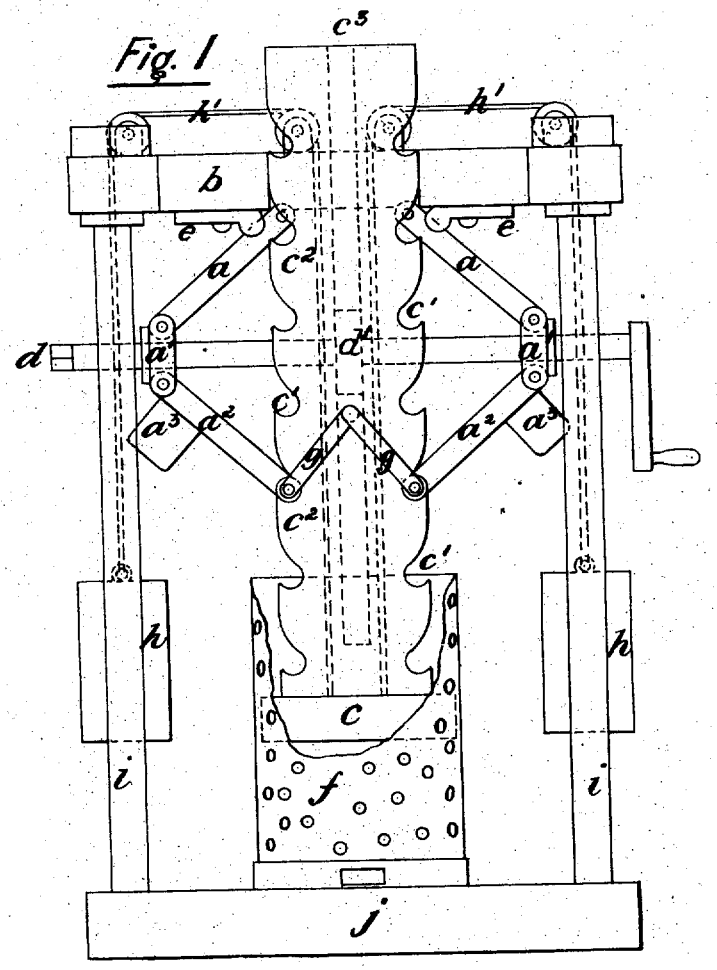
Figure 2:
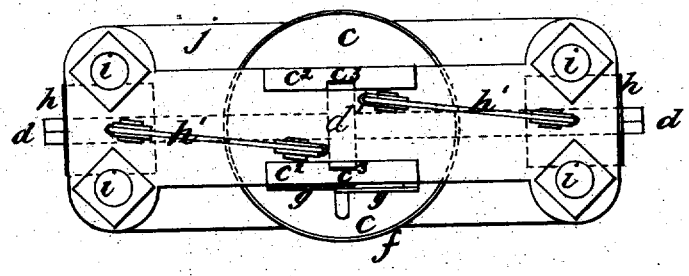

Figure 1 is a front elevation, and Fig. 2 is a plan view.

*a a* represent the upper parts of the toggle-joints, which have bearings in, and suspend from, the head-block *b*, the lower ends of them being pivoted to the nuts $a^1$ $a^1$. The lower parts $a^2$ $a^2$ are also pivoted to the nuts $a^1$ $a^1$, their lower ends being free and rounded, so as to work in the notches $c^1$ $c^1$, made in the extensions $c^2$ $c^2$ of the follower *c*, said extensions passing up and sliding in recesses made in the sides of the head-block *b*. The toggle-joints are drawn together by the right-and-left-handed screw *d*, working in the nuts $a^1$ $a^1$. On the middle of the screw *d* is a collar, *d'*, which fits into the grooves $c^3$ $c^3$, made in the inner sides of the extensions $c^2$ $c^2$, thereby compelling the toggle-joints to move with an equal speed to or from the center line of the follower *c* upon turning the screw *d*. When the follower *c* has been forced down by the straightening of the toggle-joints, the slides *e e*, secured to the under side of the head-block *b*, are pushed into the notches $c^1$ $c^1$, thus holding down the follower *c*, while the toggle-joints are moved out again by the screw *d*, the pawls $a^2$ $a^2$ sliding out of the notches $c^1$ $c^1$, and being forced into upper notches by the counter-weights $a^3$ $a^3$. Upon again straightening the toggle-joints, the follower is forced farther down, and so on as far as necessary, thus doing away with all packing, besides saving considerable time. The follower *c* is shown fitting into a lard or oil hoop, *f*. The pawl-joints $a^2$ $a^2$ are thrown and held out of contact with the notched follower by depressing the links *g g*, which are pivoted to the lower ends of them, so that the follower may be readily raised as it is counterpoised by the weights *h h*, hanging between the rods *i i*, which connect the head-block *b* to the base *j*. The weights *h h* are attached to the follower *c* by means of ropes or chains *h'* *h'* passing through holes in the head-block *b* and over pulleys *b'* *b'*.

I claim as my invention—

1. The combination of the screw *d*, nuts $a^1$ $a^1$, and the pawl joints or arms $a^2$ $a^2$, operating and acting directly as pawls within the notches of the follower *c*, as and for the purposes set forth.

2. The counterpoised follower *c*, in combination with a toggle-lever press, as hereinbefore set forth.

3. In a press in which the follower may be reversed independently of the operating-screw or toggle-arms, the combination of the notched follower provided with guiding-slots $c^3$ and a central hub, *d*, between the screws, as described, and for the purposes set forth.

4. The combination of the screw-shaft *d*, pawl toggle-joints *a* $a^2$, notched follower *c*, and weights *h h*, constructed and operating substantially as hereinbefore set forth.

ALFRED SHEDLOCK.

Witnesses:
WM. STARRETT,
WM. H. HALLOWELL.